No. 868,332. PATENTED OCT. 15, 1907.
H. DONNER.
TAKE-UP DEVICE FOR KNITTING MACHINES.
APPLICATION FILED JUNE 11, 1906.
6 SHEETS—SHEET 1.
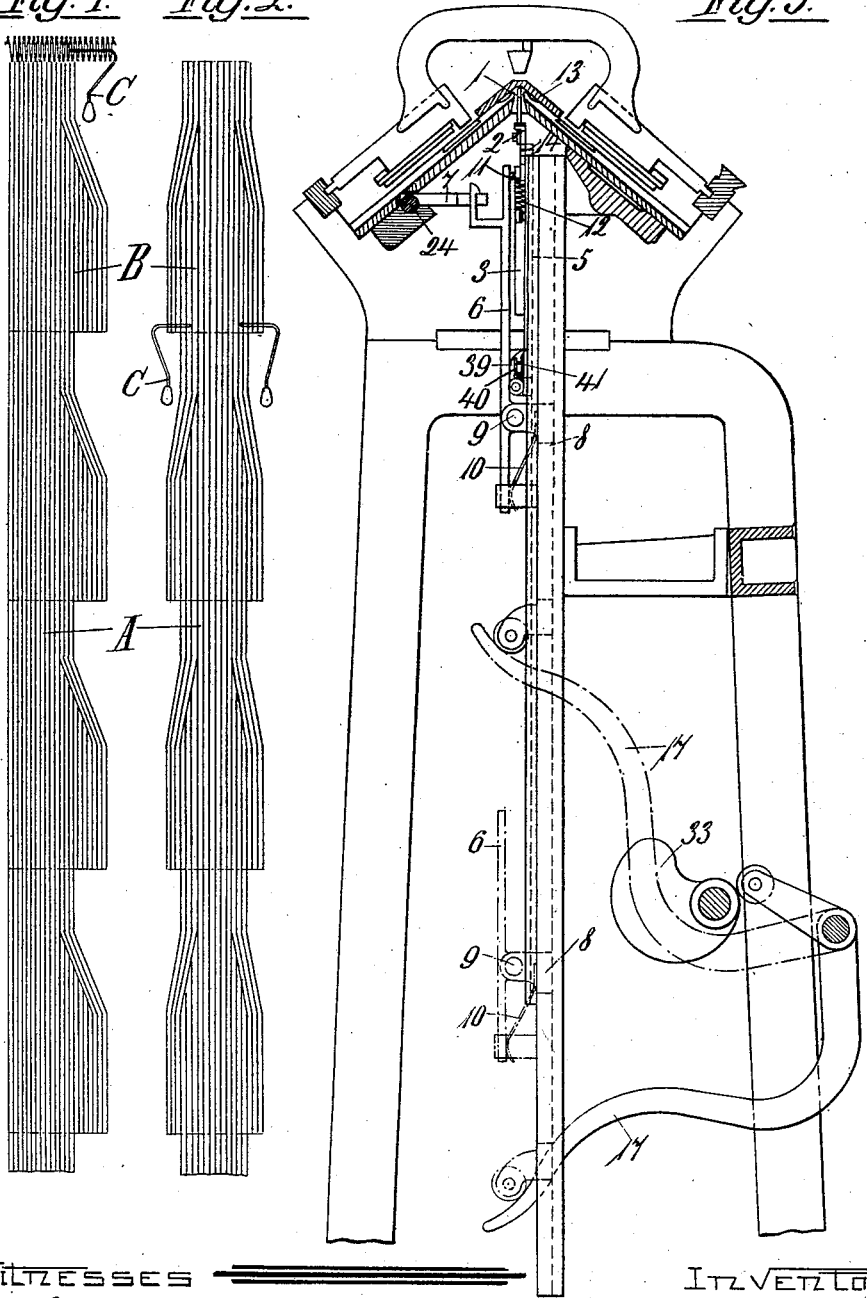

No. 868,332. PATENTED OCT. 15, 1907.
H. DONNER.
TAKE-UP DEVICE FOR KNITTING MACHINES.
APPLICATION FILED JUNE 11, 1906.
6 SHEETS—SHEET 2.
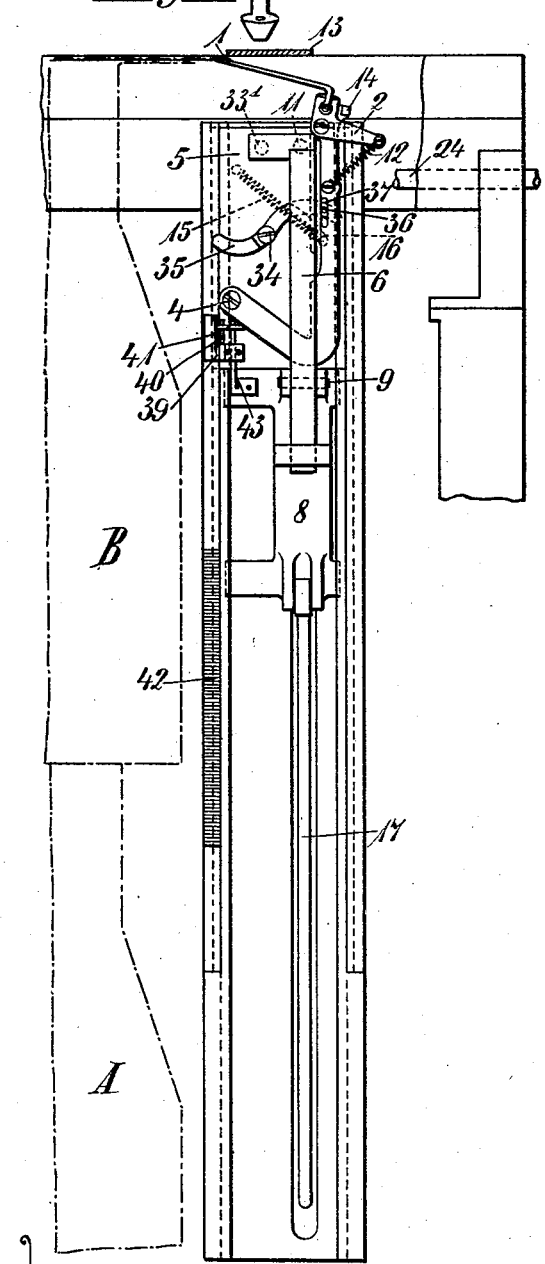
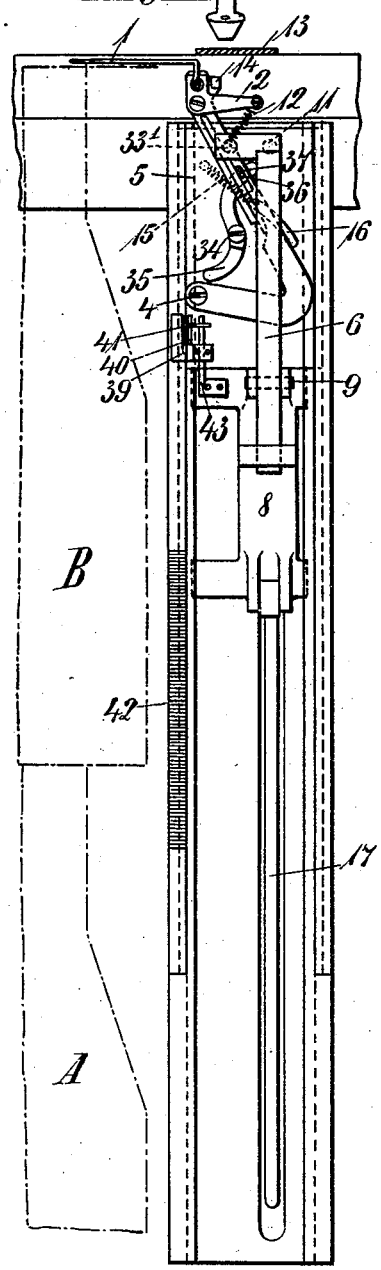

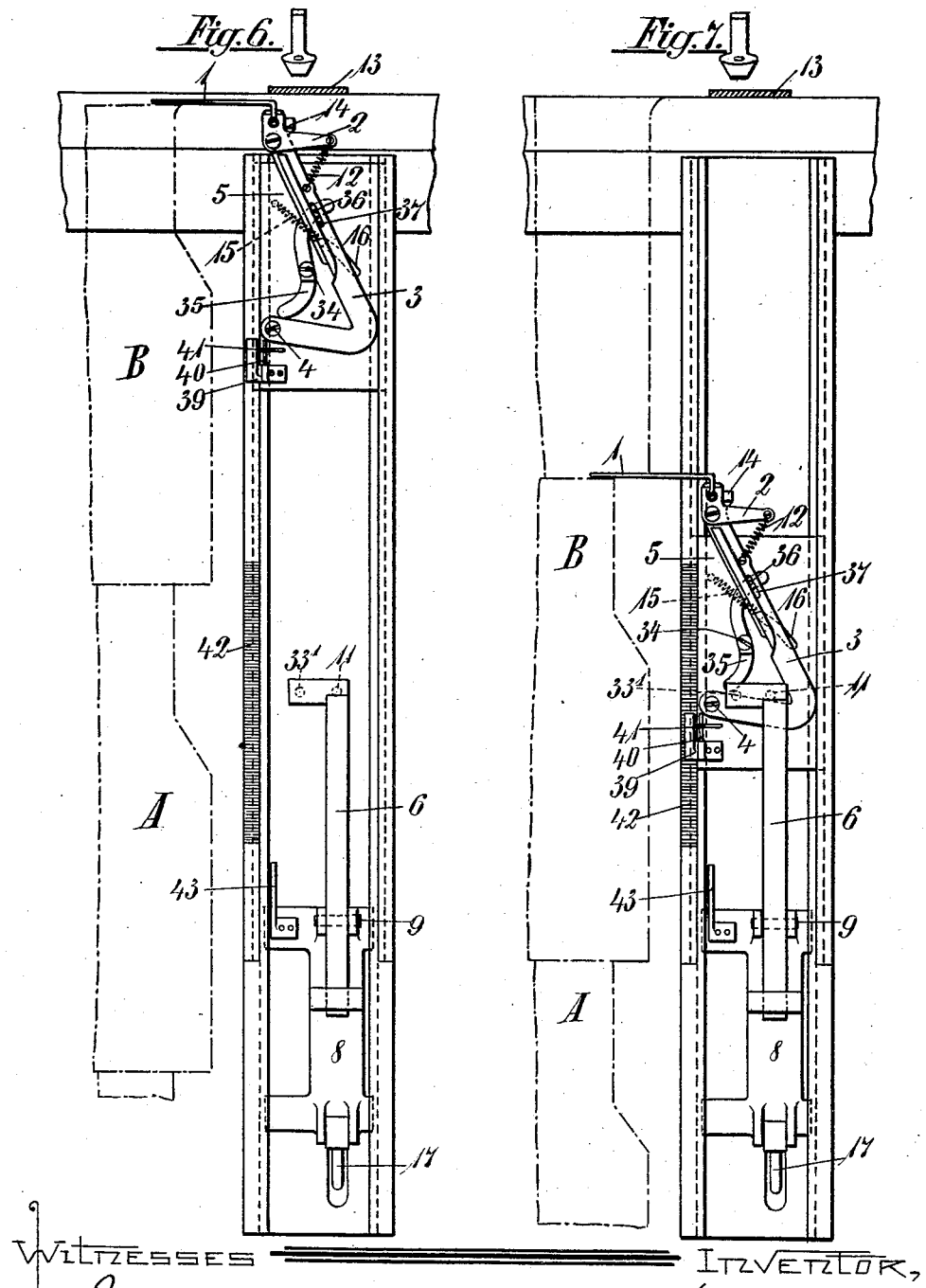

No. 868,332.  
PATENTED OCT. 15, 1907.
H. DONNER.  
TAKE-UP DEVICE FOR KNITTING MACHINES.  
APPLICATION FILED JUNE 11, 1906.
6 SHEETS—SHEET 4.
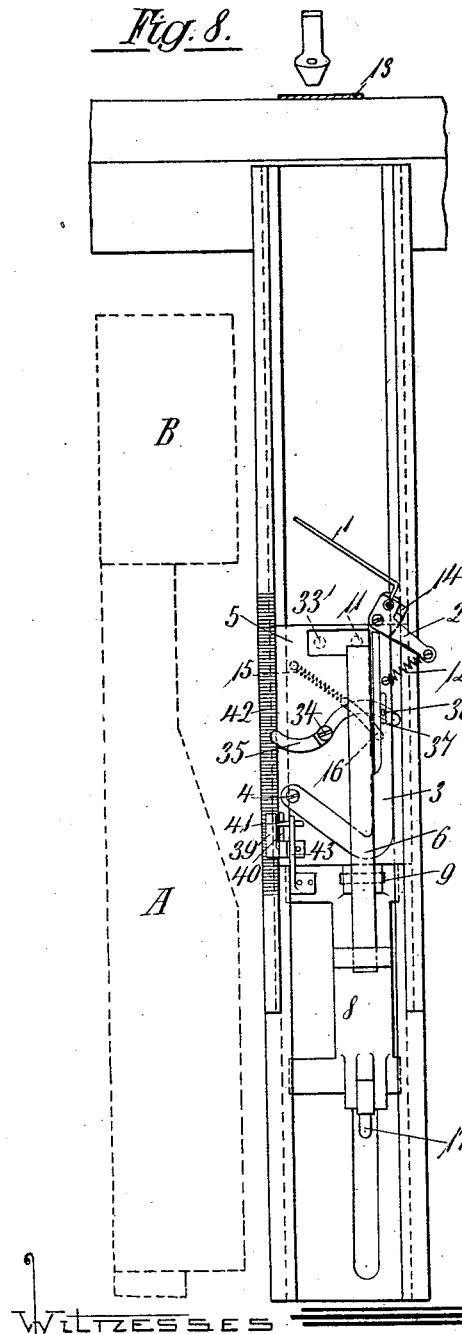
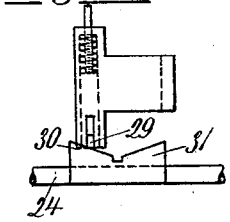
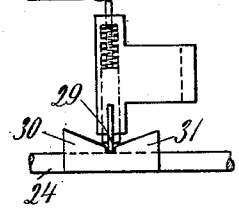
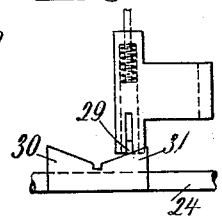
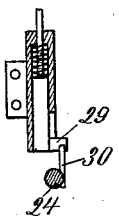
Witnesses  
Inventor,  
Hermann Donner, No. 868,332. PATENTED OCT. 15, 1907.
H. DONNER.
TAKE-UP DEVICE FOR KNITTING MACHINES.
APPLICATION FILED JUNE 11, 1906.

6 SHEETS—SHEET 5.

Witnesses
Wm. D. Bell
A. Glatt

Inventor,
Hermann Donner,
by Gartner & Seward,
Attorneys

No. 868,332.

PATENTED OCT. 15, 1907.

H. DONNER.
TAKE-UP DEVICE FOR KNITTING MACHINES.
APPLICATION FILED JUNE 11, 1906.

6 SHEETS—SHEET 6.

UNITED STATES PATENT OFFICE.

HERMANN DONNER, OF CHEMNITZ, GERMANY.

TAKE-UP DEVICE FOR KNITTING-MACHINES.

No. 868,332.  Specification of Letters Patent.  Patented Oct. 15, 1907.

Application filed June 11, 1906. Serial No. 321,230.

*To all whom it may concern:*

Be it known that I, HERMANN DONNER, a citizen of the German Empire, residing at Chemnitz, in the Kingdow of Saxony, German Empire, have invented certain new and useful Improvements in Take-up Devices for Knitting-Machines; and I do hereby declare the following to be a full, clear, and exact description of the invention, such as will enable others skilled in the art to which it appertains to make and use the same.

The improvements described hereinafter and shown in the accompanying drawings relate to a self acting (auxiliary) take-up device for Lamb knitting machines and their purpose is to effect the take-up of freshly commenced parts of full-fashioned goods knitted in endless bands, either plain circular fabrics or flat ribbed.

Figure 9:
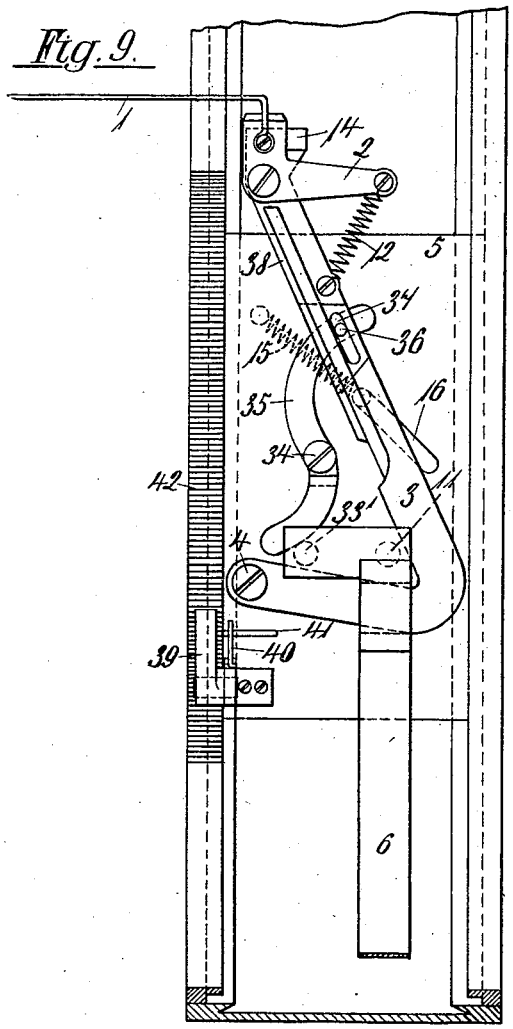
Figure 10:
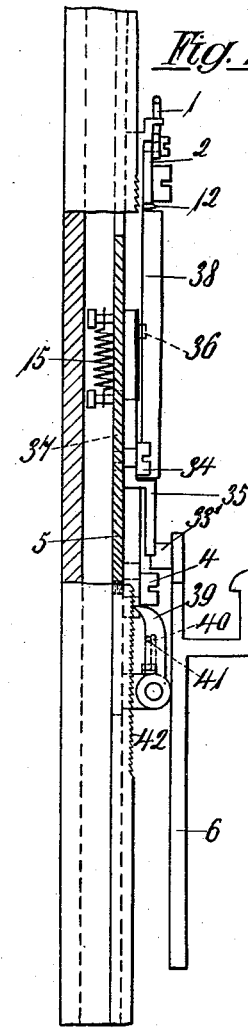
Figure 11:
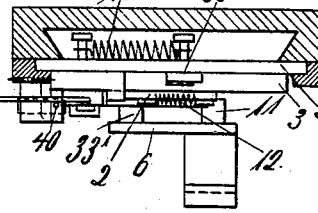
Figure 12:
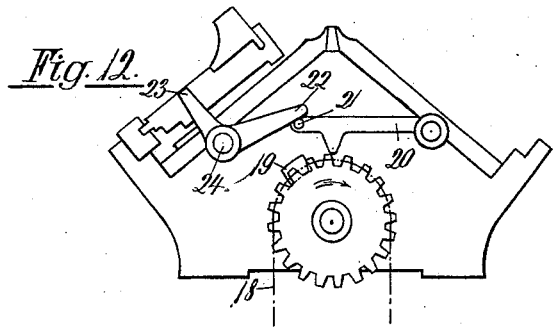
Figure 17:
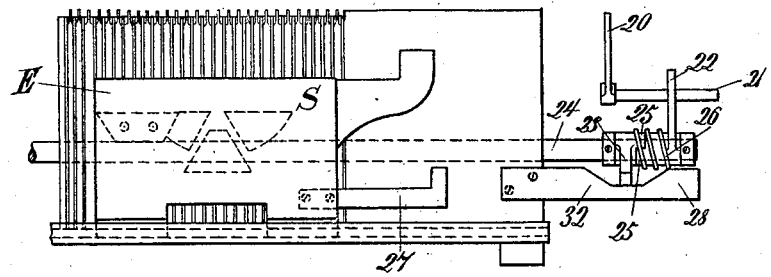
Figure 18:
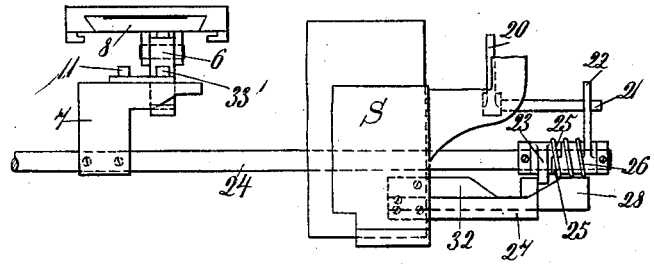
Figure 19:
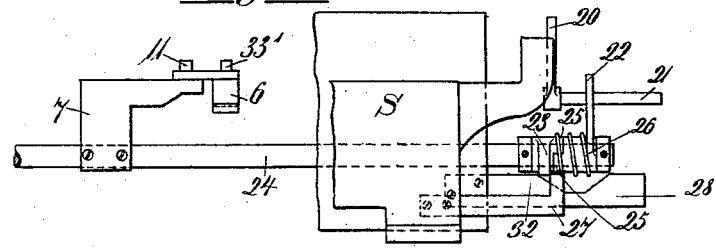

In the accompanying drawings, Figures 1 and 2 show knitted bands of two types of stockings, to wit, the plain circular and the flat-ribbed types, respectively; Fig. 3 is a view in section taken on a vertical line immediately to the left of a rack bar 42 in Fig. 4; Fig. 4 is an elevation of the right hand end of the frame of a flat knitting machine, the front half of the machine being assumed to be removed and showing the pulling off device in elevation. Figs. 5, 6, 7, 8 and 9 are views similar to Fig. 4 showing different positions of the parts there illustrated and Fig. 9 being on a larger scale than Figs. 5—8; Fig. 10 is a view partly in side elevation and partly in section of the parts seen in Fig. 9; and Fig. 11 is a horizontal sectional view in a plane just above the rod 1 in Figs. 9 and 10; Fig. 12 is a side elevation of the machine, illustrating the mechanism from which the falling of the pulling-off bar and its accessories is controlled; Figs. 13, 14 and 15 are views illustrating different positions of a certain bar 24 and means tending to maintain the same in a given position, while Fig. 16 is a vertical sectional view through said means and bar; and, Figs. 17, 18 and 19 are views illustrating different positions of said bar and parts operating in connection therewith under the control of the mechanism shown in Fig. 12.

During the knitting of full-fashioned goods it is often necessary to allow a broad piece B to follow a narrow piece A (Figs. 1 and 2) as, for instance, in the knitting of stocking lengths which are connected with one another in band form either plain circular as in Fig. 1, or flat ribbed as in Fig. 2. With this object, after the completion of the narrow part A of a piece of material, the setting up course of a fresh piece of material B, is made broader at D (Fig. 1), and now the operator must suspend in the new loops D a weighted take-up hook c, which gives to the new piece the pulling off tension. In mechanically operated machines this causes loss of time, and in order to avoid this, the present invention provides a weighted pulling off bar which is automatically inserted at the right time, pulls off the goods during the necessary time, and then is again automatically withdrawn from the goods.

The part of the machine utilized for catching the wider part of the goods is a small rod 1 (Figs. 3—8) fully as long as the newly commenced row of loops D (Figs. 1 and 2) hanging thereon and fast on an elbow piece 2, which is pivotally mounted on a lever 3 (Figs. 3—8) rocking on a pivot 4, on a slide 5 and guided by a curved slot 16 in said slide. The slide 5 is adapted to move up and down in the frame of the machine (Figs. 3—8 and Fig. 11). Another (two-armed) lever 6 (Figs. 3—8), forked at its upper end (Fig. 3), is suspended on a support plate 7 (Figs. 3, and 19), and carries a second slide 8 (Figs. 3—8 and 18 and 19) in which it is pivotally mounted at 9 and is pressed by a spring 10 (Fig. 3) downwards to the left and upwards to the right, so that it rests with the bolt 11 on the lever 3 of the take-up bar 1, and prevents the latter swinging out to the left.

The entire apparatus is placed at the right hand side near the end of the machine, beneath the needle plates (Fig. 4). If, as in Fig. 2, a fresh start is to be made on both sides of the goods, the same apparatus is provided also on the left hand side of the knitting machine. In the position of repose of the apparatus indicated in Fig. 4, the bar 1 encounters a cover plate 13 lying over the needle plates, without lever 2 bearing against the stop 14 of the lever 3 under the action of the spring 12. If the lever 6 (Fig. 3) be drawn to the left, which is rendered possible by the hereinafter explained form and displacement of the plate 7 (see Fig. 3), the stop 11 moves away from the lever 3, and a spring 15 (Fig. 4) now draws the lever 3 to the left (Figs. 5 and 6), while the take-up bar rests on the net row D in the machine (Fig. 5). In order to avoid, in this first net row, a shortening of the outer loops by the tension of the thread and the lifting of their needles, the locking arrangement (Fig. 17) contains an auxiliary triangle E which secures these needles against displacement. Finally if plate 7 (Fig. 19) be entirely drawn away from the hook of the lever 6, the lever 6, under the action of the weight of the slide piece 8, slips downwards until the roller of the slide piece 8 rests on the lever 17 (Fig. 3, lower position of 17, also Fig. 6). The slide 5 is now no longer supported by the slide piece 8, as is the case in Fig.4, it therefore hangs with the bar 1 in the new goods, and forms their take-up weight. The elbow piece 2 also rests on the stop 14 (Figs. 5, 6 and 7) and the bar 1 is held with certainty on the loops. This throwing of the device into the working position is operated automatically by the machine itself by connecting the device with a counting mechanism, for instance, a counting chain 18 (Fig. 12) which hangs on a chain wheel at the side of the machine, and at each row or each round of the goods is moved forward to the extent of one link. It lifts by means of a link, with elevated surface 19, the lever 20, and by the pin 21 on this lever also the lever 22, so that the lever 23 is lowered. The two levers 22 and 23 are pivotally mounted on the displaceable bar 24 (Figs. 12—19) but are held between two stop rings, and the clutches 25 of their hubs usually engage one another (Fig. 17) as a tension spring 26, one end of which is fast to the lever 22 and the other on the lever 23, draws the two hubs of the levers together (23 to 22). Now if by means of the chain 18, or rather the elevated link 19, the arm 22 be lifted (Fig. 12), the clutch 25 of its hub (Fig. 17) is turned, and the clutch of the other arm 23 follows this turning in consequence of the pull of the spring 26, that is to say, the arm 23 descends into the notch of a bar 28—32, mounted on the frame. In this position the arm 27, moving with the carriage S (Fig. 17), encounters the lever 23 and thus, in the last portion of the movement of the carriage, pushes the entire bar 24 with levers 22 and 23 to the right; now the bar 24 carries in its outward movement the support plate 7 (Figs. 3, 18 and 19) of the lever 6, which hitherto stood against the lever 6 in the position Fig. 19, but by the movement to the right, now comes into the position shown in Fig. 18, and thus with its broad part draws the lever 6 (Fig. 3) to the left, i. e. the pin 11 away from the lever 3, so that the spring 15, as above explained, throws the take-up mechanism into action. The lever arm 23 displaced by the stop 27 (Fig. 18), then rises upwards on the sloping edge 28 until it arrives over 27, and its support bar 24 is now drawn to the left by the spring wedge 29 (Fig. 14) and the sloping edge 30, which are arranged on the left hand side of the frame of the machine and on the bar 24 respectively, until in the middle position (Fig. 14) so that 23 (Fig. 18) moves away over 27 to the left and again drops down into the notch between 28 and 32. The spring connection 26 (Fig. 18) allows of this rising and falling of the lever 23, while the lever 22 always remains held by the chain in the upper position. By this time the carriage S (Fig. 17) has reached the end of its movement and now it returns towards the left hand side, and the inner side of the stop 27 (Fig. 19) again encounters the arm 23 and draws the bar 24 with the support plate 7, towards the left, whereby the latter is moved entirely away from the lever 6 (compare also Fig. 3); the slide 8 of this lever falls downwards and no longer supports the slide 5 (Fig. 6), as before stated, so that the take-up device hangs free in the goods. While the arm 23 (Fig. 19) is drawn to the left, it soon rises up the sloping edge 32 and the bar 24, displaced with it, comes with its inclined part 31 (Fig. 13) under the spring key or wedge 29. Now, as soon as 23 has risen above the height of 27, the wedge 29 acting on the inclined surface 31 presses the bar 24 again to the right, and the arm 23 slips over 27 to the right and again drops down into the notch between 32 and 28. In the meantime, however, the chain 18 (Fig. 12) has also moved forward one link, the elevated link 19 quits the lever 20, the latter drops down with 21 and 22, and 23 is raised and when next operated no longer lies in the way of the arm 27.

When the take-up device (as shown in Fig. 7) has pulled off the new goods to a sufficient length, so that now the further take-up can act on the entire width of the goods B, the chain 18 again acts with an elevated link on a lever combination by means of which the cam disk 33 (Fig. 3) is thrown into action. This disk brings the lever 17 into the upper position and lifts the slide 8 with the lever 6 (Fig. 7). The pin 11 of this lever encounters the lever 3 and presses it to the right, whereby the bar 1 is drawn out of the goods (Fig. 8). The slide 8 also lifts the slide 5 with the parts 3, 2 and 1, until finally the hook of the lever 6 snaps into the carrying plate 7 (Fig. 3), whereby the device has reached its position in which it is held in readiness for being again thrown into action.

When the take-up device as shown in Fig. 7 has pulled off a sufficient length of the new goods so that the ordinary take-up device can act upon the goods in their whole breadth, the chain 18 acts, through suitable means (not shown) to turn the eccentric 33 (Fig. 3). This eccentric pushes the lever 17 into its raised position and lifts the slide 8 together with the lever 6 (Fig. 7). Thereupon the socket 33′ of the lever 6 meets the lower extremity of the lever 35 rotatable round the bolt 34 and slides upwards on its surface, thereby turning the double lever 35 and, owing to the bolt 36 at the upper extremity of the lever 35 and by means of the slot 37 within the lever 3, turning the lever 3 so far to the right till the bolt 11 of the lever 6 slides upon the surface 38 of lever 3 and presses the same to the right, thereby causing the withdrawal of the bar 1 from the goods (Fig. 8).

In order to keep the slide steady during the withdrawal of the bar, it is provided with a pawl 39 engaging with the spring 40 and the bolt 41 in the rack bar 42, preventing thereby the slide 5 from moving. When the bar 1 is removed from the goods, the pawl 39 is brought out of engagement from the rack bar 42 and now the slide 8 raises the slide 5 with the parts 3, 2 and 1 until the hook of the lever 6 engages with the carrier plate 7 (Fig. 3), whereby the initial position of the device is regained.

Having thus fully described my invention, what I claim as new and desire to secure by Letters Patent is:

1. In a take-up mechanism for Lamb and similar knitting machines, the combination of the machine frame, a slide movable up and down therein, a lever carried by the slide, a finger carried by said lever, said lever being movable to bring the finger into substantial parallelism with the knitting plane, means whereby to shift the lever to bring said finger into said position, and means for causing the slide to move downwardly, substantially as described.

2. In a take-up mechanism for Lamb and similar knitting machines, the combination of the machine frame, a slide movable up and down therein, a lever carried by said slide, a finger carried by said lever, said lever being actuated to hold the finger in substantial parallelism with the knitting plane, and means for retaining said lever against assuming said position, substantially as described.

3. In a take-up mechanism for Lamb and similar knitting machines, the combination of the machine frame, a slide movable up and down therein, a lever carried by said slide, a finger carried by said lever, said lever being actuated to hold the finger in substantial parallelism with the knitting plane, and means for retaining said lever against assuming said position and for causing the slide to move downwardly, substantially as described.

4. In a take-up mechanism for Lamb and similar knitting machines, the combination of the machine frame, a slide movable up and down therein, a lever carried by said slide, a finger carried by said lever, said lever being actuated to hold the finger in substantial parallelism with the knitting plane, another slide movable up and down in said frame and normally maintaining said first-named slide elevated, a lever connected to said last-named slide and acting to normally retain said first-named lever against assuming said position, and means for supporting said lever and the slide, substantially as described.

5. In a take-up mechanism for Lamb and similar knitting machines, the combination of the machine frame, a slide movable up and down therein, a lever carried by said slide, a finger carried by said lever, said lever being actuated to hold the finger in substantial parallelism with the knitting plane, another slide movable up and down in said frame and normally maintaining said first-named slide elevated, a lever connected to said last-named slide and acting to normally retain said first-named lever against assuming said position, means for supporting said lever and the slide, and means for first moving said last named lever to cause it to release the other lever and for subsequently further moving said lever to cause it to be released from said supporting means, substantially as described.

6. In combination, with the machine frame and the carriage, a pulling-off finger, a movable support therefor, and means, actuated from the carriage, for actuating said support, substantially as described.

7. In combination, with the machine frame and the carriage, a pulling-off finger, a movable support therefor, means, actuated from the carriage, for causing the movement of said support, and means for rendering said last-named means actuated from said carriage at predetermined intervals, substantially as described.

8. In a take-up mechanism for Lamb and similar knitting machines, the combination of the machine frame, a slide movable up and down therein, a lever carried by the slide, a finger carried by the lever, said lever being movable to bring the finger into substantial parallelism with the knitting plane, another slide adapted to support said first-named slide, another lever connected to said last-named slide, a support for said last-named lever movable in said frame to disengage itself from said lever, and means for moving said support, substantially as described.

9. In a take-up mechanism for Lamb and similar knitting machines, the combination of the machine frame, a slide movable up and down therein, a lever carried by the slide, a finger carried by the lever, said lever being movable to bring the finger into substantial parallelism with the knitting plane, another slide adapted to support said first-named slide, another lever connected to said last-named slide, a support for said last-named lever movable in said frame to disengage itself from said lever, means, actuative from the carriage, for moving said support, and means for rendering said last-named means actuative from said carriage at predetermined intervals, substantially as described.

In testimony whereof I affix my signature to this specification, in the presence of two witnesses.

HERMANN DONNER.

Witnesses:
PAUL DONNER,
REINHOLD KRETZSCHMAR.